United States Patent
Le Mer et al.

(10) Patent No.: US 7,617,802 B2
(45) Date of Patent: Nov. 17, 2009

(54) CONDENSATION HEAT EXCHANGER

(75) Inventors: Joseph Le Mer, Ty Nod, 29600 Morlaix (FR); Rocco Giannoni, Via Fiori Oscuri, 3 - 20121 Milan (IT)

(73) Assignees: Rocco Giannoni, Milan (IT); Joseph Le Mer, Morlaix (FR); Giannoni France, Morlaix (FR)

( * ) Notice: Subject to any disclaimer, the term of this patent is extended or adjusted under 35 U.S.C. 154(b) by 747 days.

(21) Appl. No.: 10/554,280

(22) PCT Filed: Apr. 23, 2004

(86) PCT No.: PCT/FR2004/000990

§ 371 (c)(1),
(2), (4) Date: Mar. 7, 2006

(87) PCT Pub. No.: WO2004/097310

PCT Pub. Date: Nov. 11, 2004

(65) Prior Publication Data

US 2006/0219395 A1    Oct. 5, 2006

(30) Foreign Application Priority Data

Apr. 25, 2003    (FR) .................................. 03 05105

(51) Int. Cl.
*F24D 19/00* (2006.01)
(52) U.S. Cl. ..................... 122/18.1; 122/15.1; 122/33
(58) Field of Classification Search ............... 122/15.1, 122/18.1, 19.1, 31.1, 31.2, 32, 33, 248, 266, 122/267; 165/163
See application file for complete search history.

(56) References Cited

U.S. PATENT DOCUMENTS 6,305,331 B1 * 10/2001 Fullemann et al. ......... 122/18.3

(Continued)

FOREIGN PATENT DOCUMENTS

DE         3502971 A1    7/1986

(Continued)

*Primary Examiner*—Gregory A Wilson
(74) *Attorney, Agent, or Firm*—Foley & Lardner LLP

(57) ABSTRACT

The invention relates to a condensation heat exchanger. The inventive heat exchanger consists of two co-axial helicoidal tube bundles which are positioned end-to-end, one of said bundles (2a) serving as a primary exchanger and the other (2b) serving as a secondary exchanger. Each of the aforementioned bundles comprises a tube and/or a group of flat tubes which are mounted inside a gas-impermeable casing (1). Moreover, means are provided to circulate at least one fluid to he heated inside the tubes, the casing (1) being equipped with a gas exhaust sleeve (122). In this way, a first hot gas, known as the main gas, which is, for example, generated by a burner (6), passes radially through the voids in the bundles. A deflector system (7) ensures that said main hot gas first passes through the primary exchanger (2a) from inside outwards and, subsequently, the secondary exchanger (2b) from outside inwards, after which it is discharged from the exchanger through the above-mentioned sleeve (122). The deflector (7) comprises two adjoining parallel plates (7a, 7b) which are made from a thermally-insulating material. In this way, a second (additional) hot gas can be introduced between the aforementioned plates in order to heat the fluid circulating in the secondary exchanger or to contribute to the heating thereof. The inventive condensation exchanger is suitable, for example, for domestic use.

22 Claims, 7 Drawing Sheets

U.S. PATENT DOCUMENTS

| | | | |
|---|---|---|---|
| 7,302,916 B2 * | 12/2007 | LeMer et al. | 122/18.1 |
| 7,428,883 B2 * | 9/2008 | Hamada et al. | 122/31.1 |
| 7,523,721 B2 * | 4/2009 | Hamada et al. | 122/31.1 |
| 2007/0209606 A1 * | 9/2007 | Hamada et al. | 122/18.1 |

FOREIGN PATENT DOCUMENTS

| | | | |
|---|---|---|---|
| EP | 0029573 | A2 | 6/1981 |
| EP | 0 806 616 | A | 11/1997 |
| EP | 0806616 | A2 | 11/1997 |
| EP | 1 160 520 | A | 12/2001 |
| EP | 1160520 | A2 | 12/2001 |
| FR | 2846075 | A1 | 4/2004 |
| FR | 2850451 | A1 | 7/2004 |
| GB | 2 122 928 | A | 1/1984 |
| GB | 2122928 | A | 1/1984 |
| GB | 2149484 | A | 6/1985 |
| WO | WO 94/16272 | A1 | 7/1994 |
| WO | WO 01/90656 | A | 11/2001 |
| WO | WO 01/90656 | A1 | 11/2001 |
| WO | WO 03/052327 | A1 | 6/2003 |

* cited by examiner

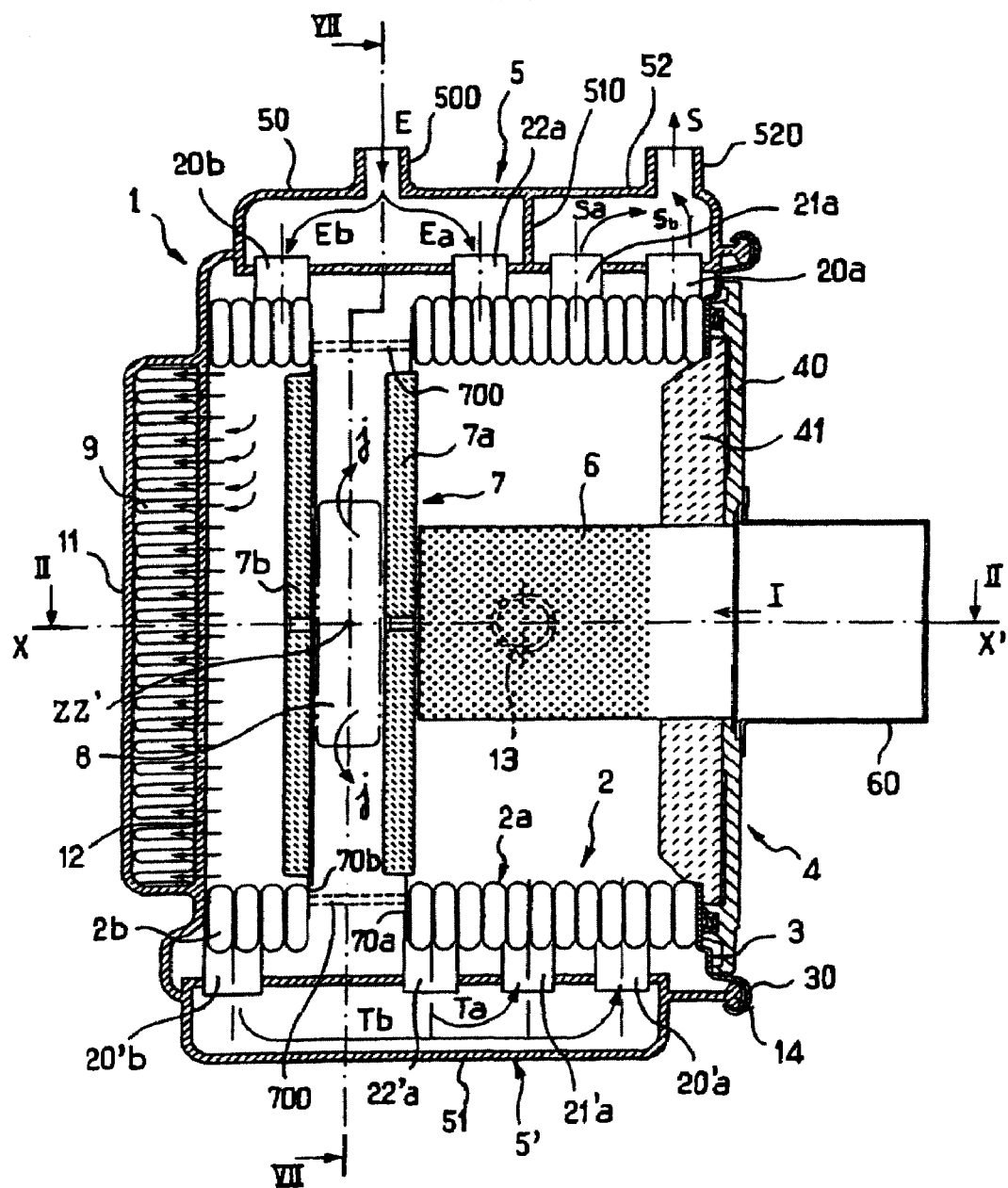

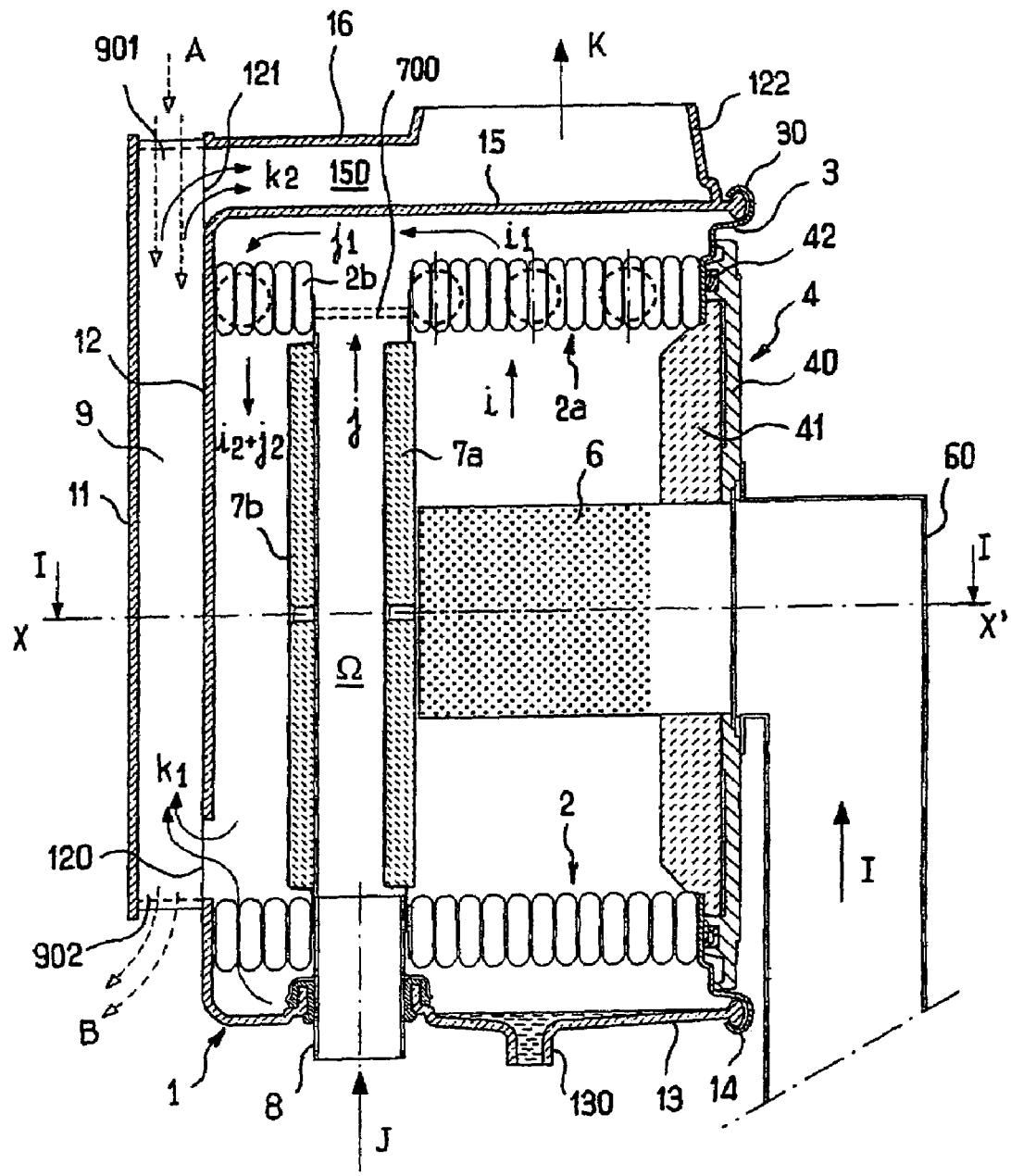

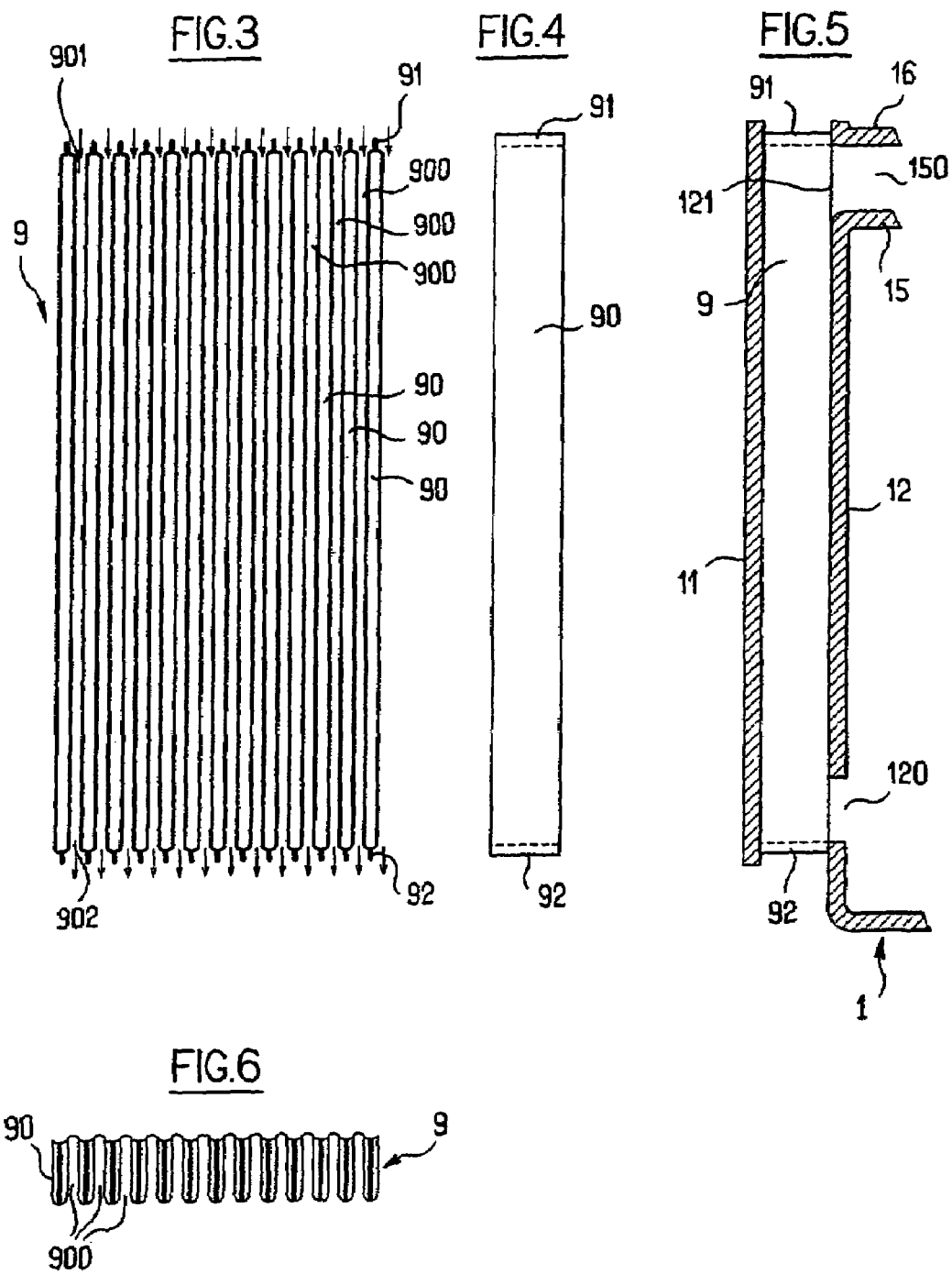

CONDENSATION HEAT EXCHANGER

The present invention relates to a condensation heat exchanger.

Advantageously, this exchanger is associated—directly or indirectly—with a burner, in particular a gas or fuel-oil burner.

This exchanger is designed particularly to be fitted to a domestic gas boiler for supplying a central-heating system and/or for providing water for household use.

The heat exchanger that is the subject of the invention, more precisely, is of the type that comprises a jacket delimiting an enclosure accommodating at least one bundle made up of a tube or tubes of flattened cross section, of the type described in document EP-B-0 678 186, to which reference may be made if required.

Document EP-B-0 678 186 describes a heat exchanger element that consists of a tube made from a material that is a good conductor of heat and in which a heat-transfer fluid, for example water to be heated, is intended to circulate.

This tube is wound as a helix and has an oval, flattened cross section, the major axis of which is substantially perpendicular to the axis of the helix, and each turn of the tube has planar faces that are separated from the faces of the adjacent turn by a gap of constant width, this width being substantially smaller than the thickness of said cross section, the space between two adjacent turns also being fixed by means of spacers consisting of bosses formed in the tube wall.

Said document also describes heat exchangers that include several elements such as those described above, arranged in different ways in the various embodiments disclosed.

An exchanger element designed in this way is capable of ensuring a very efficient heat exchange between very hot gases on the one hand, which may be generated directly by a burner mounted in the enclosure or originate from an external source, which sweep over the tubular element, and, on the other hand, the fluid, such as water, to be heated, which circulates inside the tubular element.

In fact, as it passes across the gap between the turns, in an approximately radial direction, the flow of hot gases comes into contact with a relatively large surface area of the wall of the exchanger element.

An object of the present invention is, more particularly, to propose a condensation heat exchanger of the general type set forth above, the heat-exchange elements of which are bundles of flat tubes such as those known from the above-mentioned EP-B-0 678 186.

The jacket forming the condensation units of the type described above, just like the tube or tubes, may be made from metal, particularly stainless steel.

It is, however, advantageously produced from plastic, as mentioned in French patent applications No 02/12848 (Oct. 16, 2002) and No 03/00775 (Jan. 24, 2003).

In this case, the exchanger includes means for mechanical containment of the bundle, in the axial direction of the latter, capable of absorbing the thrust forces that result from the internal pressure of the fluid circulating therein and which tends to deform the walls thereof, preventing these forces being transferred to the jacket.

The two roles hitherto fulfilled by the jacket, namely serving as the enclosure for circulation and evacuation of the hot gases and for the collection and evacuation of the condensates and, in addition, guaranteeing the mechanical robustness of the tube bundle are thus separated.

The heat exchanger according to the invention comprises two coaxial tube bundles placed end-to-end, one of which acts as primary exchanger and the other of which acts as secondary exchanger, each of these bundles consisting of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix, while the width of the gap separating two adjacent turns is constant and, particularly, smaller than the thickness of said cross section, said bundles being mounted securely inside a gas-impermeable jacket.

Means are provided in order to circulate at least one fluid to be heated, in particular cold water, inside the tube(s) forming said bundles, the above-mentioned jacket having a burnt-gas-evacuation sleeve, the exchanger being arranged such that the hot gases supplying the exchanger, for example generated by a burner, flow radially or approximately radially, through said bundles, passing through the gaps separating its turns, a deflection system also being interposed between these two bundles and arranged in such a manner that said hot gases first flow through the primary exchanger, flowing through the gaps separating its turns from the inside to the outside, then the secondary exchanger, flowing through the gaps separating its turns, this time from the outside to the inside, after which they are evacuated to the outside via said above-mentioned sleeve.

In the devices proposed hitherto, such as that shown, in particular, in FIG. 18 of document EP-B-0 678 186 cited above, the deflection system consists of a disk made from refractory material (ceramics) mounted at the free end of the burner. This disk is provided at its periphery with a thermally insulating seal that is applied against the inside of the bundle.

The principal object of the present invention is to improve this type of exchanger by virtue of an arrangement that makes it possible to supply the exchanger with a hot gas other than the principal hot gas (produced, in particular, by a burner), this arrangement being of simple design and using means that add little to the cost price of the exchanger and do not significantly increase the overall size thereof.

The condensation heat exchanger that is the subject of the present invention thus comprises, as specified above, two coaxial tube bundles, one of which acts as primary exchanger and the other of which acts as secondary exchanger, each of these bundles consisting of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix, while the width of the gap separating two adjacent turns is constant and, particularly, smaller than the thickness of said cross section, said bundles being mounted securely inside a gas-impermeable jacket, means being provided in order to circulate at least one fluid to be heated, such as cold water, inside the tube(s) forming said bundles, said jacket having a gas-evacuation sleeve, the exchanger being arranged in such a way that a first hot gas—called principal hot gas—is let into said jacket and channeled therein in such a manner that it flows radially, or approximately radially, through said bundles, passing through the gaps separating its turns, a deflection system also being interposed between these two bundles and arranged in such a manner that this principal hot gas first flows through the primary exchanger, passing between the gaps separating its turns from the inside to the outside, then flows through the secondary exchanger, passing between the gaps separating its turns from the outside to the inside, after which it is evacuated to the outside via said sleeve.

In accordance with the invention, on the one hand said deflection system (7) is composed of two plates (7a, 7b)

called deflection plates, arranged parallel and side by side at a short distance from each other, and both produced from a thermally insulating material, and, on the other hand, the exchanger includes means for introducing a second hot gas—called additional hot gas—inside said jacket (1) between the two thermally insulating deflection plates (7a, 7b) and to channel it such that it directly radially or approximately radially traverses the secondary exchanger, passing between the gaps separating its turns from the outside to the inside, either alone or at the same time as the principal hot gas that has already passed through the turns of the tube bundle acting as primary exchanger, after which it is evacuated to the outside via said sleeve.

These deflection plates, advantageously made from a material that is also heat-refractory, for example based on ceramics, are preferably centered on said axis of the helix, being arranged parallel and side-by-side, with a certain spacing, such that one of them closes one side of the tube bundle acting as primary exchanger while the other closes the adjacent (opposite) side of the tube bundle acting as secondary exchanger, and the jacket wall is penetrated by a line fitted in order to convey the additional hot gas from the outside of the exchanger to the inside of the jacket, into the space between these two plates, in such a way that this additional hot gas can flow through the gaps separating the turns of the tube bundle acting as secondary exchanger from the outside to the inside, either alone or at the same time as the principal hot gas that has already flowed through the turns of the tube bundle acting as primary exchanger, after which the cooled gas(es) is (are) evacuated toward the outside of the jacket and of the exchanger, via said sleeve.

In one possible embodiment, the exchanger includes a gas or fuel-oil burner housed coaxially inside the primary exchanger and fitted in order to generate the principal hot gas directly therein.

Furthermore, in accordance with a number of advantageous but non-limiting characteristics of the invention:
- said deflection plates are disks each fixed coaxially to the end of a bundle so as to block off the inner space thereof in a gas-tight manner;
- said deflection plates are connected together by spacers, such as tie rods, which allow the mutual spacing of said plates to be set;
- the inner space of the tube bundle acting as primary exchanger is blocked off at one end by one of said deflection plates and, at its other end, by a door fixed to the facade of the exchanger, this door being penetrated by the burner and integral with the latter;
- the inner space of the tube bundle acting as secondary exchanger is blocked off at one end by one of said deflection plates and, at its other end, by the rear wall of said jacket;
- the jacket is made from plastic while the line fitted in order to convey the additional hot gas from the outside of the exchanger to the inside of the jacket, in the space between these two plates, is made from metal, and the end wall of said jacket has an opening for the passage of and for holding said metal which has a rim turned toward the inside of the jacket, this line being fixed to said rim by means of a peripheral seal made from thermally insulating material, for example from ceramics;
- said line has a substantially rectangular cross section, the large sides of which extend parallel to the planes of said deflection plates;
- the tube bundle acting as primary exchanger has an axial length (and, correlatively, a heat-exchange capacity) substantially greater than that of the tube bundle acting as secondary exchanger;
- the exchanger is fitted in order to allow the circulation and heating of a single fluid, in particular cold water, inside the tube(s) forming said bundles;
- the exchanger is fitted in order to allow the circulation and heating of at least two different fluids circulating separately inside the tubes forming said bundles;
- the exchanger is fitted in order to allow the circulation and heating of two different fluids circulating separately, one inside the tube(s) forming the bundle acting as primary exchanger, the other inside the tube(s) forming the bundle acting as secondary exchanger.

Further characteristics and advantages of the invention will become apparent from the description and from the appended drawings that, simply by way of non-limiting examples, represent possible embodiments thereof.

In these drawings:

FIG. 1 is a diagrammatic top view of a first embodiment of the exchanger forming the subject of the invention, sectioned via a horizontal median plane referenced I-I in FIG. 2;

FIG. 2 is a diagrammatic front view of the unit of FIG. 1, sectioned via a vertical median plane referenced II-II in FIG. 1;

FIGS. 3 to 6 are views showing the gas/air exchanger;

Figure 7:
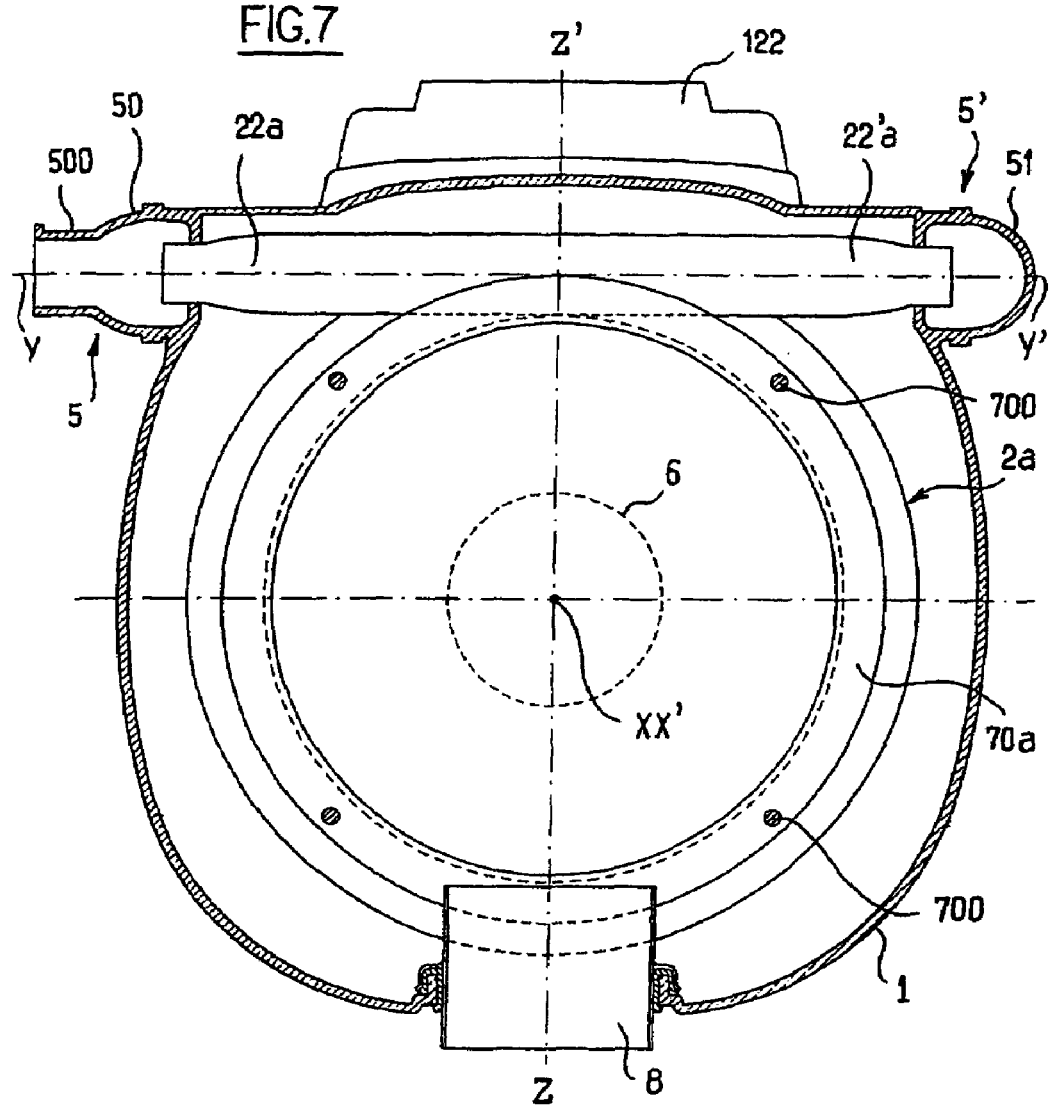
FIG. 7 is a side ("end-on") view of the unit, sectioned via the broken plane referenced VII-VII in FIG. 1.
Figure 9:
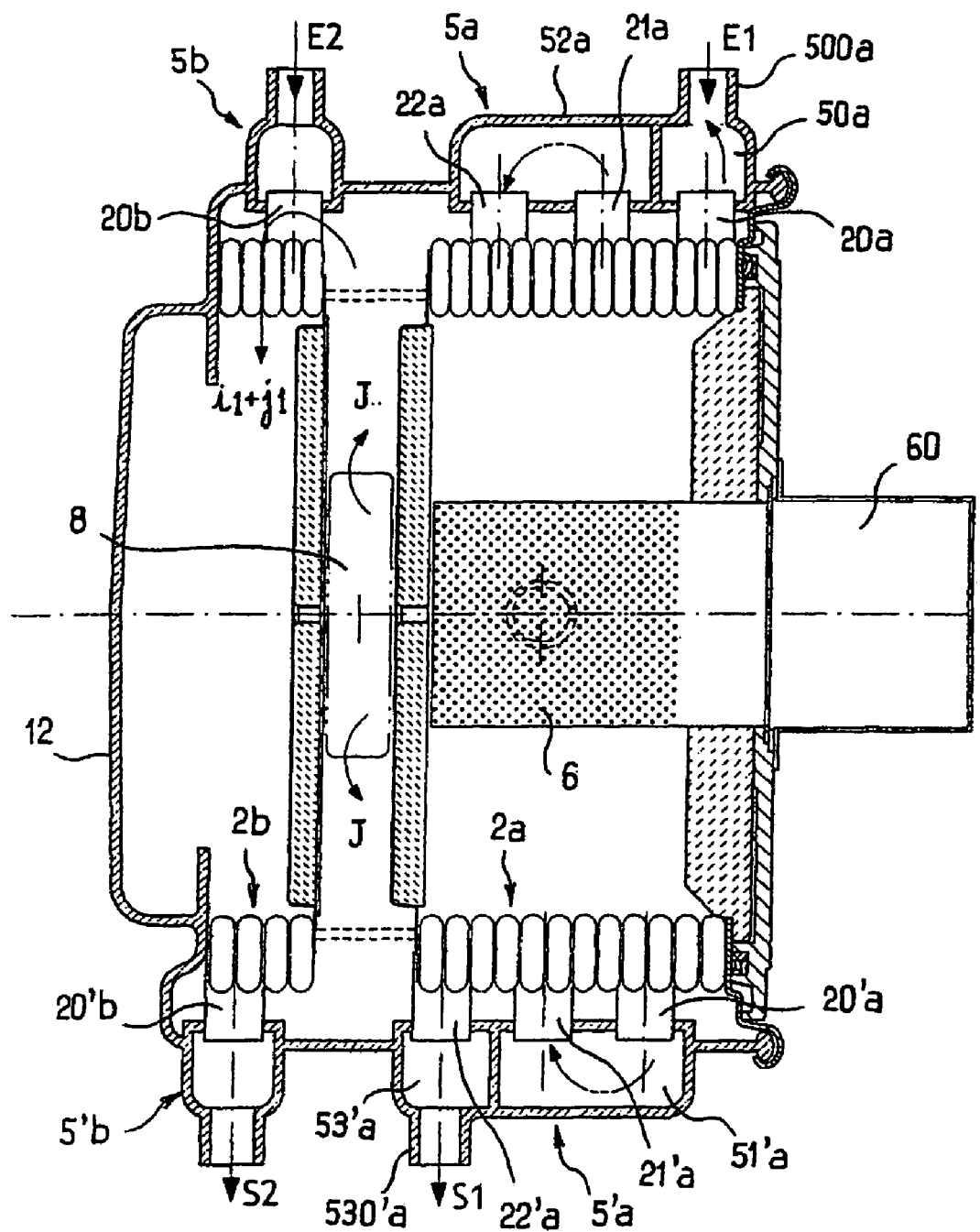
Figure 10:
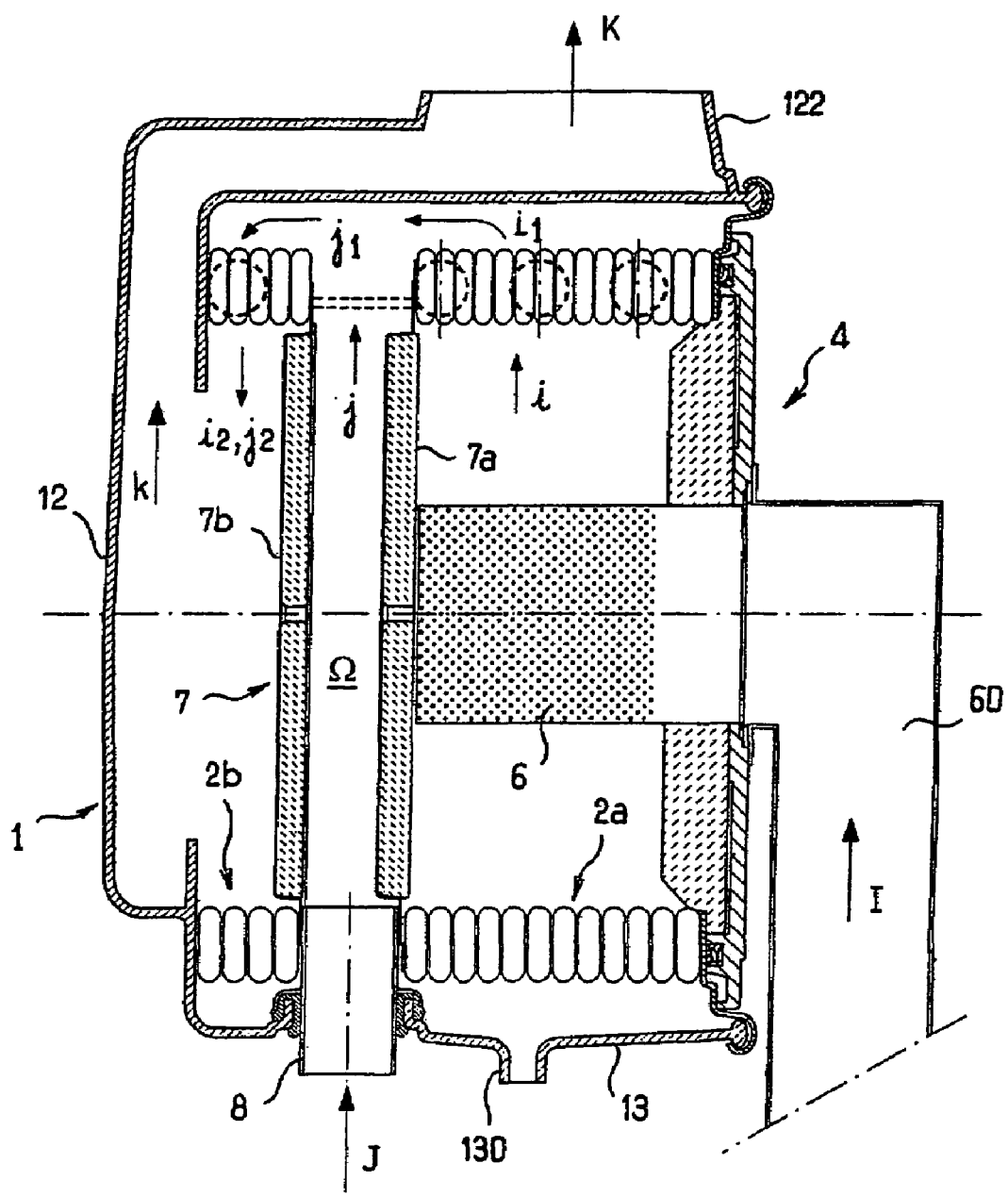
Figure 11:
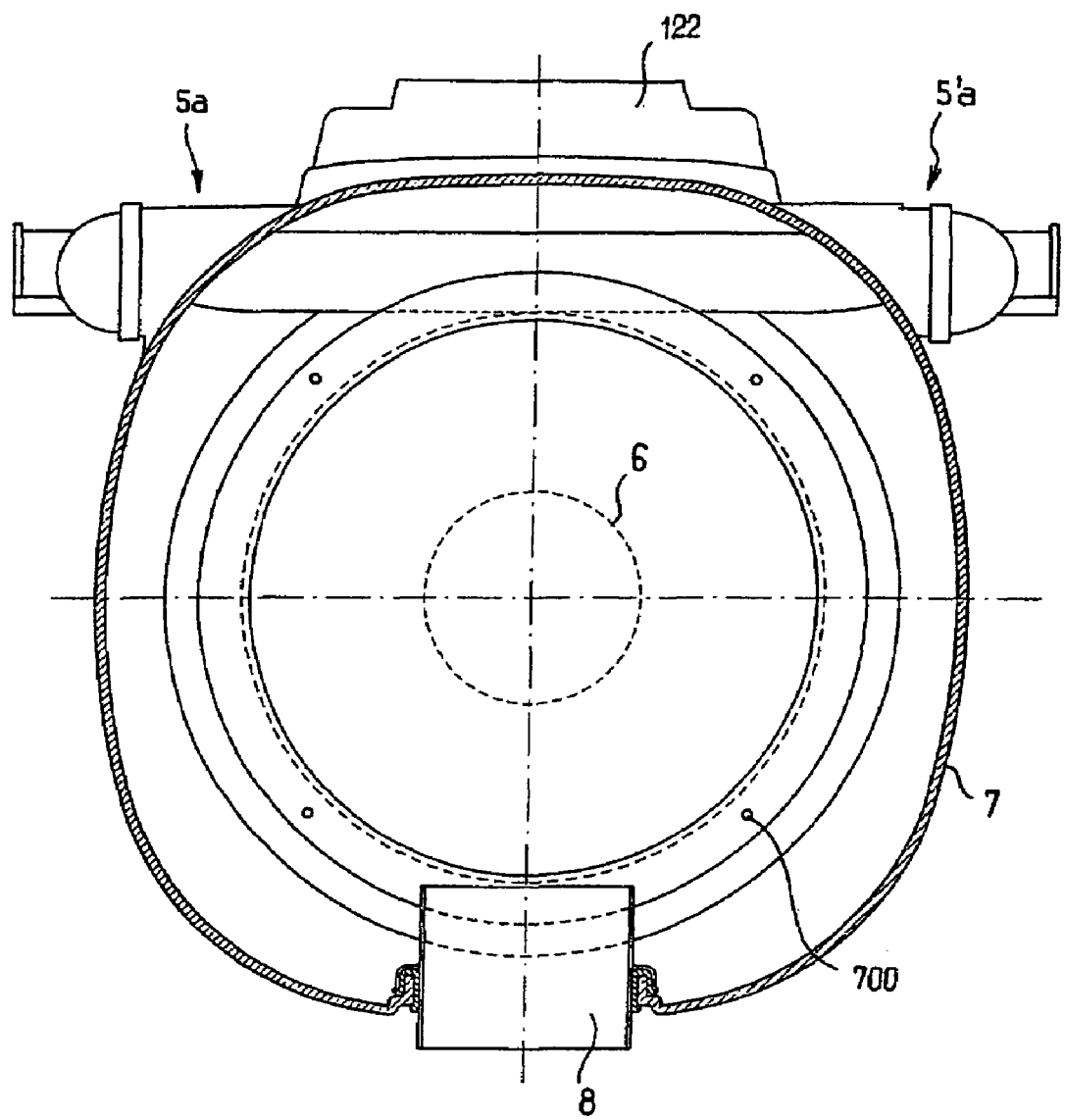

FIGS. 9, 10, and 11 are similar views to those of FIGS. 1, 2, and 7, respectively, showing a second embodiment of an exchanger according to the invention.

The exchanger shown in FIGS. 1, 2, and 7 includes a casing, or jacket, 1 that delimits an enclosure inside which a double tube bundle 2 is securely mounted, said bundle consisting of two coaxial tube bundles placed end-to-end, one (2a) of which acts as primary exchanger and the other (2b) of which acts as secondary exchanger.

This enclosure has an approximately cylindrical general shape, with a horizontal axis X-X'.

In the embodiment shown, the bundle 2a consists of a group of three adjacent tubes forming a helical coil, with an axis X-X'.

The other bundle 2b consists of a single tube, also wound as a helix and with an axis X-X'.

The three tubes forming the bundle 2a and the tube forming the bundle 2b are identical, of the same length and of the same diameter. The bundle 2a thus has an axial dimension three times as great as that of the bundle 2b.

These are tubes of flattened cross section, of which the large sides are perpendicular to the axis X-X'.

Bosses (not shown) provided on the large faces of the tubes act as spacers, delimiting a gap of substantially constant, set value between each turn.

This coil is designed to be coursed internally by at least one fluid to be heated, for example water.

In the embodiment illustrated, the four helical tubular elements are connected in pairs in parallel, and the two pairs are connected in series, the fluid to be heated being a single fluid that circulates from left to right in FIGS. 1 and 2.

Lateral manifolds 5-5' fixed to the jacket 1 allow the unit to be conventionally connected to a supply line for the cold fluid that is to be heated, this fluid to be transferred from one pair of tubes to the next, and the heated fluid to be evacuated.

Each tubular element has straight end portions, i.e. with a rectilinear axis and with a progressively variable cross section, the opening-out end part 22, 22' of which is circular.

In the example illustrated, the axis Y-Y' common to the two end portions of a tubular coil extend in, one and the same horizontal plane tangential to the coil (cf. FIG. 7), their mouths facing away from one another in an arrangement in accordance with that illustrated in FIG. 24 of European patent 0 678 186 cited above.

The entry and exit mouths of the tubular elements are suitably crimped in a leaktight manner in the openings expressly provided in the jacket 1, and they open out inside the manifolds 5, 5'.

The entry/exit manifold 5 comprises two adjacent chambers separated by an internal partition 510, namely an entry chamber 50 provided with an endpiece 500 and an exit chamber 52 provided with an endpiece 520.

The endpieces 500 and 520 are designed to be connected to a supply pipe for the fluid to be heated and an evacuation pipe for the heated fluid, respectively.

The chamber 50 is connected to the entry end portions 20*b*, 22*a* of the two bundle elements 2*b*, 2*a*, which the fluid to be heated enters. The chamber 52 is connected to the exit end portions 20*a*, 21*a* of the two bundle elements 2*a*, via which the heated fluid exits.

The opposite manifold 5' has a single transfer chamber 51 connected both to the exit end portions 20'*b*, 22'*a* of the two bundle elements 2*b*, 2*a*, which the fluid to be heated enters, and to the entry end portions 20'*a*, 21'*a* of the two bundle elements 2*a* via which the heated fluid exits.

In FIG. 1, the arrows symbolize the path of the fluid passing through these coils.

The stream E entering via the endpiece 500 is subdivided into two streams Eb and Ea that each flow through a coil, combine in the chamber 51 and are transferred—arrows Ta, Tb—into the other two coils in order to emerge—arrows Sa, Sb—in the chamber 52 and exit therefrom—arrow S—via the endpiece 520.

Advantageously, the jacket 1 is made from plastic.

It is, for example, produced by rotational molding or by injection molding.

The jacket is made, for example, from two half-shells that are heat-welded together after the tube bundles have been installed inside one of them.

The jacket 1 is open on one of its sides, in this case on the side located on the right in the view of FIG. 1.

When the unit is in use, some of the water vapor contained in the burnt gases condenses in contact with the tube walls.

Reference 13 denotes the bottom wall of the enclosure. In a known manner, this bottom slopes, which allows evacuation of the condensates to an exit orifice (drain plug) 130.

The rear wall (on the left-hand side in FIGS. 1 and 2) of the jacket is double. It is formed from a vertical principal wall, bearing reference 12, and an external wall portion 11, parallel to the wall 12, constituting the bottom of a reinforcement, or dish, accommodating a gas/air heat exchanger 9.

The upper wall 15 of the jacket is connected, at the rear, to the principal wall 12.

It is surmounted by a partition 16 connected to the outer wall 11.

The walls 15 and 16 define a channel 150 that connects the double rear wall 11-12 to an evacuation sleeve 122 for the cooled gases.

Of course, the orifice 130 is connected to an evacuation line for the condensates, while the sleeve 122 is connected to an evacuation line for the flue gases, for example a chimney duct. These lines are not shown in the figures.

The (open) right side of the jacket is blocked off by a facade element 3 fixed over its entire periphery by a rim 30 crimped in a gastight manner onto a peripheral bead 14 bordering the jacket entrance.

A seal, for example a silicone seal (not shown), may advantageously be provided at this point.

The facade plate 3, which is, for example, made from stainless steel, is normally closed off by a removable door 4.

In the embodiment shown, the door 4 is in two parts. It is composed of an outer plate 40 made from heat-resistant plastic or metal and an inner plate 41—thicker—made from an insulating material, for example based on ceramics. An annular seal with lips 42 housed in a suitable groove made in the plate 40 enables the plate to be applied in a gastight manner against the outer face of the facade 3.

Each of the plates 40, 41 has, in the central part, a circular opening traversed by a burner 6, for example a gas burner, which is secured to the door 4 by means that are not shown.

Suitable means connected to the burner 6 allow a mixture of combustible gas and air, such as propane, and in particular air to be supplied to the unit via a line 60.

These means may comprise a fan (not shown) capable of blowing the gas mixture into the burner.

The burner 6 is a cylindrical tube with a closed end, the wall of which is pierced with a multitude of small holes allowing the passage of the combustible mixture, radiating from the inside toward the outside of the tube.

The outer surface of this wall constitutes the combustion surface.

An ignition system of known type (not shown) that includes, for example, a spark-generating electrode, is obviously associated with the burner.

The burner is located coaxially in the center of the coil 2, but does not extend over the entire length of the latter. It is located only inside the bundle 2*a*.

This device is provided with a deflection system 7 interposed between the two bundles 2*a*-2*b*.

This deflection system 7 is composed of a pair of deflection plates consisting of identical disks 7*a*, 7*b* made from heat-refractory, thermally insulating material, for example a material based on ceramics. They are each supported by a discoid frame in the form of a thin plate 70*a*, 70*b*, respectively, of stainless steel, of larger diameter.

The bundle 2*a* is held captive axially between the door 4 and the disk 7*a*, the support plate 70*a* of which is fixed against its last turn (inner side, on the left).

Similarly, the bundle 2*b* is held captive axially between the rear wall 12 and the disk 7*b*, the support plate 70*b* of which is fixed against its last turn (on the side facing the inside of the jacket, on the right).

Longitudinal rods 700 forming spacers, for example four in number, regularly distributed at a 90-degree angle (cf. FIG. 7) ensure correct holding of the two discoid plates 7*a*, 7*b* at a given distance from one another.

Should the jacket be made from plastic, mechanical containment means for each bundle, of the type described in French patent application No 02/12848 mentioned above, are provided in order to prevent the axial expansion forces being transmitted to the jacket wall.

Furthermore, these bundles are preferably surrounded by a barrel forming a heat shield to prevent the jacket being directly exposed to the hot gases, in an arrangement similar to that described in French patent application No 03/00775, also mentioned above.

Neither the mechanical containment means nor the barrel have been shown here in order not to overburden the drawings and the present description to no avail.

The end wall 13 of the jacket has an opening traversed in a gastight manner by a line 8, in the form of a tubular sleeve, of vertical axis Z-Z'.

This is preferably a metal of rectangular cross section with rounded (not sharp) corners, the bottom portion of which, which emerges from the jacket, is adapted in order to be connected to a tube (not shown) for supplying a hot gas. Its top part opens out inside the jacket, in the space $\Omega$ between the two disks 7a, 7b.

Said hot-gas-supply tube is advantageously equipped with a shut-off valve which selectively allows or prevents the passage of the hot gas.

The large faces of the line 8 are arranged parallel to the planes of these disks, perpendicularly, therefore, to the axis X-X'. Its thickness, i.e. the dimension of its small sides, is just slightly smaller than the inter-disk space.

Figure 8:
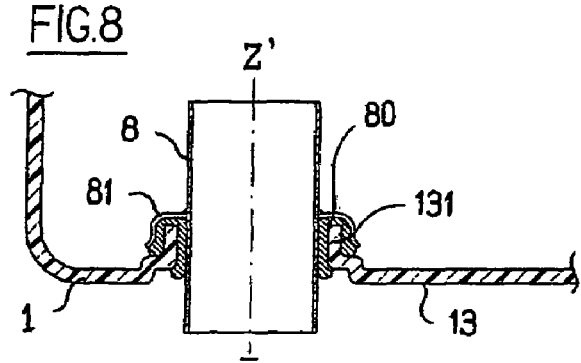
FIG. 8 is a detailed view (in section) showing the way in which the hot-gas supply line is mounted in the end wall of the jacket.

As illustrated in the detailed view of FIG. 8, the wall opening receiving the line 8 has a peripheral rim 131 in the form of a sleeve of vertical axis Z-Z', facing upward, i.e. toward the inside of the jacket 1. The line 8 is held in this sleeve by means of an insulating seal 80, for example made from ceramics, which covers said rim 131. A drawn ring 81 welded to the periphery of the line 8 and clipped over the seal secures the assembly as a whole.

This arrangement thermally insulates the metal 8 in which gas can flow at a high temperature from the plastic jacket wall.

Furthermore, the presence of the rim 131, the top end of which is located above the level of the condensates likely to be deposited in the bottom of the jacket, prevents any risk of these condensates leaking into this zone.

With reference, now, to FIGS. 3 to 6, a description will be given of the structure of the gas/air heat exchanger/recuperator installed in the rear face of the unit.

As already stated, the rear wall 12 of the jacket 1 is vertical and it has a double wall 11-12. This double wall delimits a substantially flat vertical compartment that is open at its top and bottom ends, and the gas/air heat exchanger/recuperator 9 is inserted in this compartment.

This heat exchanger is produced from a flat sheet of "concertina-bellows"-folded stainless steel (cf. FIGS. 3, 4, and 6). This is a very thin sheet having, for example, a thickness of the order of 0.3 mm.

The faces corresponding to the folds of this bellows form parallel, vertical planar bands perpendicular to the walls 11 and 12.

They are pinched and welded in pairs at their top 91 and bottom 92 ends. Each pair of welded bands constitutes a flat tube 90 that is open toward the front (toward the right in FIGS. 4 and 5) and closed at its top and bottom ends.

The space 900 between two pairs of welded bands, however, is open both toward the rear (toward the left in FIGS. 4 and 5) and at its top and bottom ends.

In the example illustrated, the exchanger 9 includes a series of thirteen flat tubes 90 alternating with a series of twelve spaces 900. These spaces have the same width as the tubes 90.

This bellows structure has a configuration in the general form of a flat rectangular box that can be nested from the top downward in the compartment delimited by the two walls 11 and 12, the cross section of which complements that of this box.

This compartment is open at its top and bottom ends.

The inner wall 12 has a pair of bottom 120 and top 121 windows (rectangular openings). The top window is located above the upper wall portion 15 forming the mouth of the gas-evacuation channel 150.

These openings arrive opposite the lower and upper portions of the exchanger 9 structure when the latter is inserted into the rear wall 11-12. They extend over the entire width of this structure.

In this way, each of the tubes 90 is closed at its top and bottom ends by pinched, welded zones 91, 92 to the rear by a bellows fold, and is closed off toward the front over the majority of its height by the wall 12.

However, it opens out in its bottom and top parts, respectively, via the window 120 inside the unit and via the window 121 inside the channel 150 that leads to the sleeve 122.

Each of the spaces 900 located between these tubes is open at its top and bottom ends, closed at the front by a bellows fold, and closed off to the rear by the wall 11. It thus constitutes a kind of chimney that opens out toward the top and bottom only.

Suitable means (not shown) ensure that the exchanger 9 structure is held in its housing, between the two walls 11 and 12, and that the seal is satisfactory.

With reference, in particular, to FIGS. 1 and 2, the way in which this unit functions will now be explained.

The tube for supplying a hot gas to the pipe 8 will firstly be regarded as closed.

The fluid, for example cold water, to be heated was placed in circulation. A combustible gas mixture, symbolized by arrow I, is supplied to the burner 6 via the line 60.

The burner 6 now alight, the hot gases generated by it firstly flow through the first part 2a of the bundle 2 (on the right of the deflection plate 7a), passing between the tube gaps radially, from the inside to the outside (arrows i). They cannot escape axially owing to the presence of the deflection disk 7a.

By virtue of the presence of the upper part of the wall of the jacket, they cannot escape immediately via the sleeve 122 either.

They are channeled toward the left (arrow $i_1$) and forced to pass through the rear part 2b of the exchanger, beyond the other deflection plate 7b, this time from the outside to the inside (arrow $i_2$), preheating the water circulating in the tube bundle.

Their only means of exit is thus the window 120, through which they flow (arrows $k_1$).

At this stage, their temperature has dropped substantially owing to the heat transfer that has taken place between the hot gases and the fluid flowing through the bundles 2a and 2b.

By virtue of the presence of the gas/air exchanger/recuperator 9, it will nevertheless be possible for this temperature to be reduced further.

The gases traversing the window 120 are channeled into the tubes 90, which they flow through from bottom to top in order to emerge therefrom via the upper window 121 (arrows $k_2$) and, finally, to be evacuated via the channel 150 and the exit sleeve 122 (arrow k).

An appropriate device (not shown), such as a fan for example, allows fresh air to be drawn in from the atmosphere in the top part 901 of the exchanger 9 and forces it to penetrate the tubular spaces 900 (arrows A) and to flow through them from top to bottom. Heat exchange thus takes place with the still-hot gases rising in the adjacent tubes 90.

This heated air emerges at the bottom end 902 of the tubular spaces 900 (arrows B).

Advantageously, it is recovered and channeled by appropriate means (not shown) so as to supply the burner after having been mixed with the combustion gas. The overall performance of the unit is thus substantially improved and combustion is better.

The complementary cooling performed by the gas/air exchanger also makes it possible to reduce visible pollution resulting from the escape of the burnt gases out of the sleeve, on the outside of the building. The white plumes that are the result of too great a difference in temperature between these gases and the outside air are notably reduced or even eliminated.

According to an important characteristic of the present invention, it is possible to supply the exchanger not only with the hot gas emanating from the burner but also with another hot gas, called additional hot gas, which is then introduced inside the jacket via the line 8, the valve of which has, of course, previously been opened.

This supplementary supply may take place optionally and, depending on the circumstances, either at the same time as that provided by the principal supply emanating from the burner or autonomously (burner extinguished).

In the first case, the additional gas helps to heat the fluid flowing through the tube bundles 2 and the air passing through the exchanger 9.

In the second case, it carries out this dual heating alone.

The additional hot gas introduced into the unit (arrow J) arrives in the space Ω and escapes radially from between the disks 7a, 7b (arrows j).

It is then channeled toward the rear of the enclosure of the exchanger (arrow $j_1$) and forced to penetrate the secondary exchanger, radially from the outside to the inside (arrow $j_2$), thus heating the fluid passing through the coil 2b or providing said fluid with additional heating.

Lastly, it passes through the gas/air exchanger and emerges from the unit via the sleeve 122.

In the second embodiment of the invention, illustrated in FIGS. 9 to 11, the configuration is globally similar to that just described, except for the fact that the unit has no gas/air exchanger.

Elements that are identical or similar to those of the first embodiment have been given the same reference numerals and no further explanation will be given as to their nature and function.

This exchanger is distinguished from the previous one essentially in that it is capable of heating two different fluids, one circulating inside the bundle 2a acting as primary exchanger and the other inside the bundle 2b acting as secondary exchanger.

The bundle 2a is composed of three adjacent elements mounted in series.

The first fluid enters on one side via an entry manifold 5a (arrow $E_1$) and emerges on the other via an exit manifold 5'a (arrow $E_2$).

The manifold 5a is subdivided into two chambers 50a and 52a.

The manifold 5'a is subdivided into two chambers 51'a and 53'a.

Said fluid enters the chamber 50a via an endpiece 500a and enters the first element of the bundle 2a via its end portion 20a. It leaves via the opposite end portion 20a' and emerges in the chamber 51'a.

The path is similar through the next two elements, and the fluid emerges, heated up, from the bundle 2a via the endpiece 530'a.

The second fluid penetrates the element forming the secondary bundle 2b via a single-chamber entry manifold 5a and exits therefrom, heated up, via an exit manifold 5'b, also with a single chamber.

By virtue of this arrangement, the first fluid receives the heat of the hot gases emanating from the burners and passing through the bundle 2a from the inside to the outside.

The second fluid receives the heat from the hot gases emanating from the burners that has already passed through the bundle 2a from the inside to the outside, when they pass through the bundle 2b, this time from the outside to the inside, and/or the heat from the additional hot gas originating from the line 8.

It goes without saying that this second embodiment of the exchanger could, like the first, be provided with a gas/air heat exchanger/recuperator.

The principal hot gas is not necessarily generated by a burner housed in the primary bundle. Like the additional hot gas, it may originate from an external source and be conveyed inside the primary bundle by a line connected axially to the door 4.

A possible application of the exchanger that is the subject of the invention, which may be mentioned, relates to boilers producing two kinds of energy, namely heat and power. The heat is intended, for example, for heating buildings and for providing domestic hot water.

It is this heat that is conveyed by the principal hot gas.

The electricity is generally produced by an alternator driven by a small heat engine. This engine may be of the piston or turbine type, or of the external-combustion "Stirling" type.

The hot gases emanating from the exhaust of these engines is at a high temperature—by way of indication, between 400 and 650° C.

They thus contain significant energy, which it is advantageous to recover in order to improve the installation's output.

It is these gases that act as "additional gas", supplying the unit via the line 8.

In the solution employing two different fluids, which is the subject of the second embodiment, the first fluid is, for example, designed to supply a central-heating system and the second to heat domestic hot water.

Other applications, for example in the field of fuel cells, require the use of fluids of different types, while energy emission takes place simultaneously. The invention lends itself well to such applications.

It goes without saying that it is possible, without departing from the scope of the invention, to provide bundles designed and connected in such a way that they allow more than two liquids to be heated.

The dimensions of the unit, which are governed particularly by the cross section, the diameter and the length of the tube bundles, and also—as appropriate—by the type of burner used, are obviously adapted to the desired power output and to the conditions of use.

The unit is advantageously equipped with a temperature probe fitted in order to cut off the intake of hot gases when the probe detects a pre-set excessive temperature.

For an exchanger of this type to function correctly, it is essential for the space Ω where the additional hot gas arrives to be very well thermally insulated not only from the inner space of the primary bundle 2a but also from the inner space of the secondary bundle 2b because the temperature levels prevailing there are very different. This result is achieved by virtue of the fact that each deflection plate 7a and 7b is made from a thermally insulating material and, preferably, from a heat-refractory material.

The invention claimed is:

1. A condensation heat exchanger, which comprises two coaxial tube bundles, one of which acts as primary exchanger and the other of which acts as secondary exchanger, each of these bundles consisting of a tube or of a group of tubes arranged end-to-end, forming a helical coil, in which the wall of the tube(s) is produced from a material that is a good conductor of heat and has a flattened, oval cross section, the major axis of which is perpendicular or approximately perpendicular to the axis of the helix, while the width of the gap separating two adjacent turns is constant and, particularly, smaller than the thickness of said cross section, said bundles being mounted securely inside a gas-impermeable jacket, means being provided in order to circulate at least one fluid to be heated, inside the tube(s) forming said bundles, said jacket having a gas-evacuation sleeve, the exchanger being arranged in such a way that a first hot gas—called principal hot gas—is let into said jacket and channeled therein in such a manner that it flows radially, or approximately radially, through said bundles, passing through the gaps separating its turns, a deflection system also being interposed between these two bundles and arranged in such a manner that this principal hot gas first flows through the primary exchanger, passing between the gaps separating its turns from the inside to the outside, then flows through the secondary exchanger, passing between the gaps separating its turns from the outside to the inside, after which it is evacuated to the outside via said sleeve, characterized in that, on the one hand, said deflection system is composed of two plates called deflection plates, produced from a thermally insulating material, and in that, on the other hand, it includes means for introducing a second hot gas—called additional hot gas—inside said jacket between the two thermally insulating deflection plates and to channel it such that it flows directly, radially or approximately radially, through the secondary exchanger, passing between the gaps separating its turns from the outside to the inside, either alone or at the same time as the principal hot gas that has already flown through the turns of the tube bundle acting as primary exchanger, after which it is evacuated to the outside via said sleeve.

2. The heat exchanger as claimed in claim 1, wherein said deflection plates are disks that are fixed coaxially to the end of a bundle so as to block off an inner space thereof in a gastight manner.

3. The heat exchanger as claimed in claim 1, wherein said deflection plates are connected together by spacers.

4. The heat exchanger as claimed in claim 1, wherein an inner space of the tube bundle acting as primary exchanger is blocked off at one end by one of said deflection plates and, at its other end, by a door fixed to the facade of the exchanger, this door being penetrated by the burner and integral with the burner.

5. The heat exchanger as claimed in claim 1, wherein the inner space of the tube bundle acting as secondary exchanger is blocked off at one end by one of said deflection plates and, at its other end, by the rear wall of said jacket.

6. The heat exchanger as claimed in claim 1, wherein the jacket is made from plastic while the line fitted in order to convey a hot gas from the outside of the exchanger to the inside of the jacket, in the space between these two plates, is made from metal, characterized in that the end wall of said jacket has an opening for the passage and for holding said metal, and in that this opening has a rim turned toward the inside of the jacket, this line being fixed to said rim by means of a peripheral seal made from thermally insulating material.

7. The heat exchanger as claimed in claim 6, wherein the peripheral seal made from thermally insulating material is made from ceramics.

8. The condensation heat exchanger as claimed in claim 1, wherein the tube bundle acting as primary exchanger has an axial length substantially greater than that of the tube bundle acting as secondary exchanger.

9. The heat exchanger as claimed in claim 1, wherein the exchanger is fitted in order to allow the circulation and heating of a single fluid, in particular cold water, inside the tube(s) forming said bundles.

10. The heat exchanger as claimed in claim 1, wherein the exchanger is fitted in order to allow the circulation and heating of at least two different fluids circulating separately inside the tubes forming said bundles.

11. The heat exchanger as claimed in claim 10, wherein the exchanger is fitted in order to allow the circulation and heating of two different fluids circulating separately, one inside the tube(s) forming the bundle acting as primary exchanger, the other inside the tube(s) forming the bundle acting as secondary exchanger.

12. A condensation heat exchanger, associated with a gas or fuel-oil burner, which comprises two coaxial tube bundles placed end-to-end, one of which acts as primary exchanger and the other of which acts as secondary exchanger, each of these bundles consisting of a tube or of a group of tubes arranged end-to-end, forming a helical coil, in which the wall of the tube(s) is produced from, a material that is a good conductor of heat and has a flattened, oval cross section, the major axis of which is perpendicular or approximately perpendicular to the axis of the helix, while the width of the gap separating two adjacent turns is constant and, particularly, smaller than the thickness of said cross section, said bundles being mounted securely inside a gas-impermeable jacket, means being provided in order to circulate at least one fluid to be heated, inside the tube(s) forming said bundles, said jacket having a burnt-gas-evacuation sleeve, the exchanger being arranged such that the hot gases generated by the burner flow radially, or approximately radially, through said bundles, passing through the gaps separating its turns, a deflection system also being interposed between these two bundles and arranged in such a manner that the hot gases generated by the burner first flow through the primary exchanger, flowing through the gaps separating its turns from the inside to the outside, then the secondary exchanger, flowing through the gaps separating its turns from the outside to the inside, after which they are evacuated to the outside via said sleeve, characterized in that, on the one hand, said deflection system is composed of two plates, called deflection plates, produced from a heat-refractory, thermally insulating material, centered on said axis of the helix, arranged in parallel, side-by-side, with a certain spacing, and one of which closes one side of the tube bundle acting as primary exchanger, while the other closes the adjacent side of the tube bundle acting as secondary exchanger, and in that, on the other hand, the wall of the jacket is penetrated by a line fitted to convey an additional hot gas from the outside to the inside of the jacket, into the space between these two plates such that this hot gas can flow through the gaps separating the turns of the tube bundle acting as secondary exchanger from the outside to the inside, either alone or at the same time as the hot gases generated by the burner that have already flowed through the turns of the tube bundle acting as primary exchanger, after which they are evacuated toward the outside via said sleeve.

13. The heat exchanger as claimed in claim 12, wherein said line has a substantially rectangular cross section, the large sides of which extend parallel to the planes of said deflection plates.

14. The heat exchanger as claimed in claim 12, wherein said deflection plates are disks that are fixed coaxially to the end of a bundle so as to block off an inner space thereof in a gastight manner.

15. The heat exchanger as claimed in claim 12, wherein said deflection plates are connected together by spacers.

16. The heat exchanger as claimed in claim 12, wherein an inner space of the tube bundle acting as primary exchanger is blocked off at one end by one of said deflection plates and, at its other end, by a door fixed to the facade of the exchanger, this door being penetrated by the burner and integral with the burner.

17. The heat exchanger as claimed in claim 12, wherein the inner space of the tube bundle acting as secondary exchanger is blocked off at one end by one of said deflection plates and, at its other end, by the rear wall of said jacket.

18. The heat exchanger as claimed in claim 12, wherein the jacket is made from plastic while the line fitted in order to convey a hot gas from the outside of the exchanger to the inside of the jacket, in the space between these two plates, is made from metal, characterized in that the end wall of said jacket has an opening for the passage and for holding said metal, and in that this opening has a rim turned toward the inside of the jacket, this line being fixed to said rim by means of a peripheral seal made from thermally insulating material.

19. The condensation heat exchanger as claimed in claim 12, wherein the tube bundle acting as primary exchanger has an axial length substantially greater than that of the tube bundle acting as secondary exchanger.

20. The heat exchanger as claimed in claim 12, wherein the exchanger is fitted in order to allow the circulation and heating of a single fluid, in particular cold water, inside the tube(s) forming said bundles.

21. The heat exchanger as claimed in claim 12, wherein the exchanger is fitted in order to allow the circulation and heating of at least two different fluids circulating separately inside the tubes forming said bundles.

22. The heat exchanger as claimed in claim 21, wherein the exchanger is fitted in order to allow the circulation and heating of two different fluids circulating separately, one inside the tube(s) forming the bundle acting as primary exchanger, the other inside the tube(s) forming the bundle acting as secondary exchanger.

\* \* \* \* \*